United States Patent [19]

Takahashi

[11] Patent Number: 4,827,302
[45] Date of Patent: May 2, 1989

[54] DISTANCE MEASUREMENT APPARATUS FOR CAMERA

[75] Inventor: Yoshiharu Takahashi, Hachioji, Japan

[73] Assignee: Konica Corporation, Tokyo, Japan

[21] Appl. No.: 192,719

[22] Filed: May 11, 1988

[30] Foreign Application Priority Data

May 15, 1987 [JP] Japan .................. 62-116717
Jul. 14, 1987 [JP] Japan .................. 62-173954

[51] Int. Cl.$^4$ .............................................. G03B 3/00
[52] U.S. Cl. ................................................... 354/403
[58] Field of Search ...................... 354/403; 356/1, 4

[56] References Cited

U.S. PATENT DOCUMENTS

| 4,065,778 | 12/1977 | Harvey | 354/403 |
| 4,615,616 | 10/1986 | Shiomi | 354/403 |
| 4,733,062 | 3/1988 | Horikawa | 354/403 |
| 4,740,806 | 4/1988 | Takehana | 354/403 |
| 4,748,469 | 5/1988 | Tamura | 354/403 |
| 4,773,751 | 9/1988 | Matsuda et al. | 354/403 |

Primary Examiner—Russell E. Adams
Attorney, Agent, or Firm—Finnegan, Henderson, Farabow, Garrett, & Dunner

[57] ABSTRACT

According to the invention, a distance measurement apparatus for a camera is disclosed. In this apparatus, a plurality of light-emitting elements are arranged at different positions in a direction perpendicular to a base line and an optical axis of projected light. A driver causes the light-emitting elements to selectively emit near-distance measurement light and far-distance measurement light having a higher intensity than that of the near-distance measurement light. When an amount of light reflected by an object cannot reach a predetermined value necessary for distance measurement upon emission of a light-emitting element selected by the driver, a microcomputer controls an operation of the driver so as to cause another light-emitting element to emit light. The near- or far-distance measurement light reflected by the object is received so as to measure a distance to the object.

6 Claims, 6 Drawing Sheets

DISTANCE MEASUREMENT APPARATUS FOR CAMERA

BACKGROUND OF THE INVENTION

The present invention relates to an active type distance measurement apparatus for a camera.

A variety of methods are employed for an automatic focusing (auto-focus) function of a camera. One of these methods is a method wherein a distance to an object is measured using an active type distance measurement apparatus, and a photographing lens is moved in accordance with the measured distance.

Figure 10:
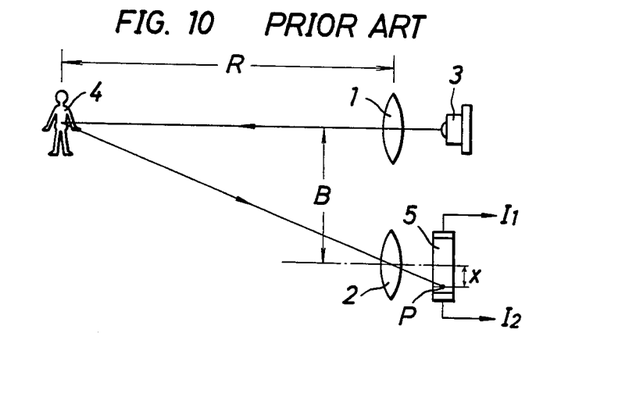
FIG. 10 is a view for explaining the principle of an active distance measurement method.

FIG. 10 is a view for explaining the principle of the active measuring method. In FIG. 10, reference numeral 1 denotes a distance measurement light projecting lens; 2, a distance measurement light receiving lens; 3, an infrared LED; 4, an object; and 5, a PSD (Position Sensitive Device) as a light-receiving element.

Figure 11:
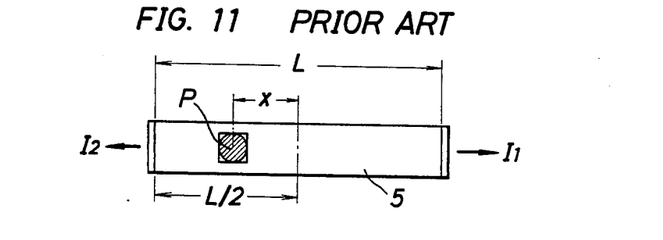
FIG. 11 is a view for explaining a PSD.

The PSD 5 is a light-receiving element which can provide two current outputs $I_1$ and $I_2$ as shown in FIG. 11 when it receives an LED image on its element surface. If a distance from the center of the element surface to an LED image P is given as x, the following relationship is established between the distance x and the currents $I_1$ and $I_2$:

$$x \times K \cdot l_N(I_1/I_2) \quad (1)$$

K: constant

Assume that an image of an object which is located at an infinity point is formed at the center of the PSD 5, and a photographing lens (not shown) is set to be focused at the infinity point. When the object 4 separated from a camera by a finite distance or less is then subjected to distance measurement, a projected spot image is focused on the PSD 5 separated from the center by the distance x. In this case, the following relationship is established between a distance R to the object 4 and the distance x:

$$R = B \cdot \frac{f_2}{x} \quad (2)$$

where B is a distance (base length) between the light projecting lens 1 and the light receiving lens 2, and $f_2$ is a focal length of the light receiving lens 2.

If a position on an optical axis of the photographing lens which can be focused for the object distance R is given as y to have an origin on the optical axis when the photographing lens is focused at the infinity point, y represents a defocusing amount, and R is represented as follows in accordance with the relation $(1/R) + \{1/(f+y)\} = (1/f)$:

$$R = f + \frac{f^2}{y} \quad (3)$$

f: focal length of photographing lens

Therefore, from equations (1) to (3), y can be calculated as follows:

$$y = \frac{f^2 x}{Bf_2 - fx} \quad (4)$$

More specifically, calculation is made using the current outputs $I_1$ and $I_2$ of the PSD 5 to obtain x, and x is substituted into equation (4) to obtain the defocusing amount y.

In recent auto-focus cameras, a variety of attempts are made to extend a possible photographing range, and a strong demand has arisen for proximity photographing. However, in the conventional active method, as the object 4 comes closer, the LED image P moving along the PSD 5 is moved to the left in FIG. 11. As the displacement of the LED image P comes closer to half a length L of the PSD 5 (i.e., L/2), the LED image P begins to fall outside the PSD 5. The LED image P falls outside the PSD 5 finally and precise distance measurement cannot e performed. In this case, the length L of the PSD 5 may be prolonged. However, the length L of the PSD 5 is limited in association with the installation space in a camera and cost.

If light reflected by a near object 4 can be received by the PSD 5 in a predetermined light emission amount of the LED 3, as the object 4 comes closer, the reflection light becomes stronger, and the output from the PSD 5 is increased and saturated over the dynamic range. Thus, accurate distance measurement cannot be performed either. In this case, if the output from the LED 3 is increased in order to improve far-distance measurement performance, the near-distance measurement becomes more difficult.

Figure 12:
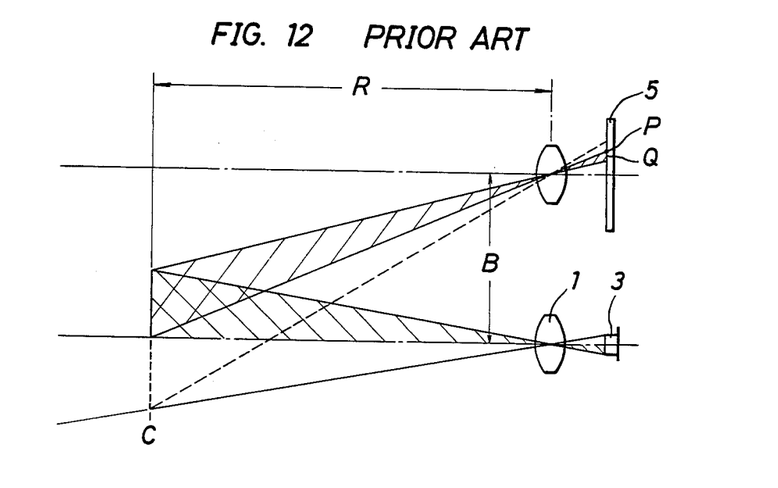
FIG. 12 is a view for explaining a distance measurement error upon far-distance measurement.

If the area of an LED chip is simply increased to increase the output from the LED 3, the size of the projected LED image is increased, and a far-distance measurement error may occur. For example, in FIG. 12, assume that an object is located at a position C. If a projected LED image from the LED 3 is radiated on the entire object and is reflected thereby, the center of gravity of the received LED image on the PSD 5 coincides with a point P. However, when only a portion of the projected LED image (hatched portion in FIG. 12) is radiated on the object and is reflected thereby, the center of gravity of the received LED image coincides with a point Q. For this reason, although the object is located at the position C, the positions of the received LED images on the PSD 5 are different, and different distance measurement results are obtained, resulting in a distance measurement error.

As described above, in the conventional distance measurement apparatus, it is difficult to accurately perform both far- and near-distance measurements.

SUMMARY OF THE INVENTION

The present invention has been made in consideration of the above situation, and has as its object to provide an active distance measurement apparatus which can accurately perform both far- and near-distance measurements.

In order to achieve the above object, according to a first characteristic feature of the present invention, a plurality of light-emitting elements are arranged at different positions in a direction perpendicular to a base line and an optical axis of projected light, and the light-emitting elements are selectively emitted so as to selectively output near-distance light and far-distance light, thereby measuring a distance to an object.

According to a second characteristic feature of the present invention, there is provided a distance measurement apparatus for a camera comprising: a plurality of light-emitting elements arranged at different positions in a direction of a base line, a light-receiving element for receiving light emitted from the light-emitting elements and reflected by an object so as to output an electric signal corresponding to a distance to the object; drive means for causing the light-emitting elements to selectively emit far-distance measurement light obtained upon emission of at least a light-emitting element at a side of the light-receiving element and near-distance measurement light having a lower intensity than that of the far-distance measurement light and obtained upon emission of a light-emitting element not at the side of the light-receiving element; arithmetic means for calculating the distance to the object based on the electric signal from the light-receiving element; correction means for correcting the distance calculated by the arithmetic means in accordance with the light-emitting element selected by the drive means; and control means for, when the light-receiving element cannot output a predetermined electric signal necessary for distance measurement only by the emission of the light-emitting element selected by the drive means, controlling an operation of the drive means to cause another light-emitting element to sequentially emit light.

DETAILED DESCRIPTION OF THE PREFERRED EMBODIMENTS

The present invention will be described with reference to the accompanying drawings.

Figures 1, 2:
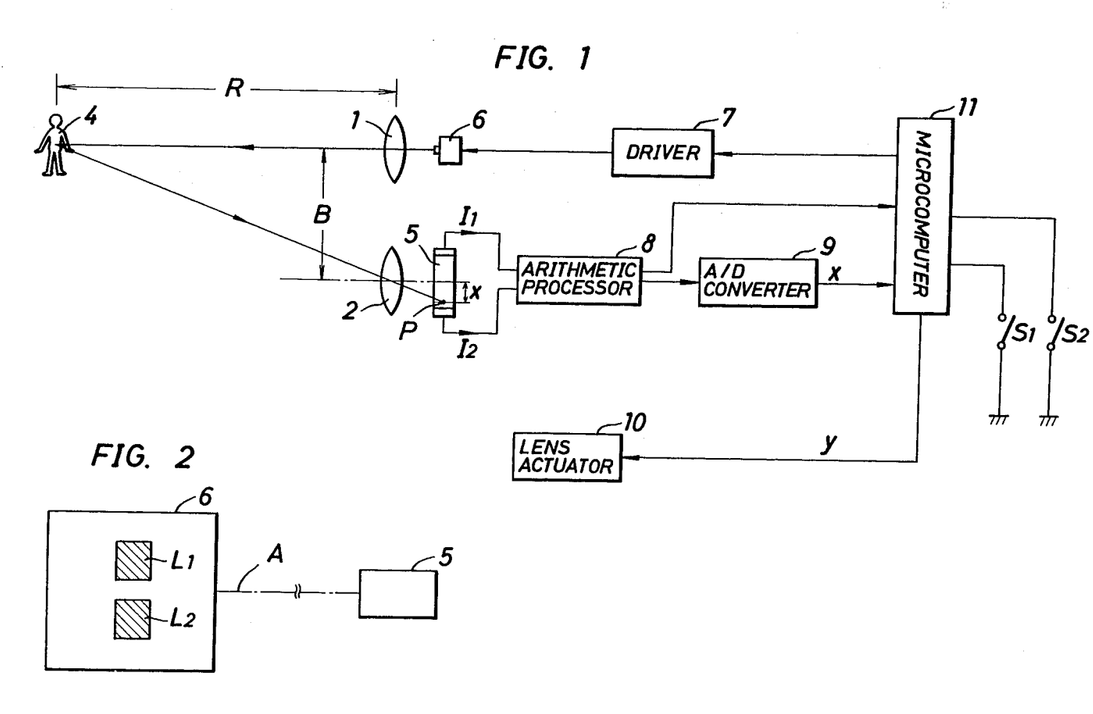
FIG. 1 is a block diagram showing an embodiment of a distance measurement apparatus for a camera according to the present invention.
FIG. 2 is a front view of an infrared LED used in the embodiment shown in FIG. 1.

FIG. 1 is a block diagram showing an embodiment of a distance measurement apparatus for a camera according to the present invention, and the same reference numerals in FIG. 1 denote the same parts as in FIG. 10.

In FIG. 1, reference numeral 6 denotes an infrared LED serving as a light-emitting element. As shown in FIG. 2, the LED 6 has two light-emitting portions $L_1$ and $L_2$ at different positions in a direction perpendicular to a base line A (a line connecting a PSD 5 and the LED 6). The light-emitting portions $L_1$ and $L_2$ have an identical light-emitting intensity. In a far-distance measurement mode, both the light-emitting portions $L_1$ and $L_2$ emit light. In a near-distance measurement mode, only the light-emitting portion $L_2$ emits light. Reference numeral 7 denotes a driver for supplying a predetermined drive pulse signal to the LED 6 so as to cause the light-emitting portions $L_1$ and $L_2$ of the LED 6 to selectively emit light.

An arithmetic processor 8 checks if a signal output from the PSD 5 falls within its dynamic range. If the signal output falls within the dynamic range, the processor 8 calculates a distance x based on equation (1) described above. If the signal output from the PSD 5 falls outside its dynamic range, the processor 8 outputs a re-emission signal to a microcomputer 11. Whether or not the signal output from the PSD 5 falls within its dynamic range is determined as follows. For example, the output currents $I_1$ and $I_2$ from the PSD 5 are converted to voltage values $V_1$ and $V_2$ by I–V converters, and the voltage values $V_1$ and $V_2$ are compared with reference voltages by comparators. For example, if the voltage value $V_1$ is larger than a predetermined lower-limit value a and the voltage value $V_2$ is smaller than a predetermined upper-limit value b ($a < V_1$, $V_2 < b$), or when the sum ($V_1 + V_2$) of the voltage values $V_1$ and $V_2$ is larger than a predetermined lower-limit value c and is smaller than a predetermined upper-limit value d ($c < V_1 + V_2 < d$), it is determined that the signal output from the PSD 5 is at a level necessary for distance measurement.

The calculation result x from the arithmetic processor 8 is A/D-converted to digital data by an A/D converter 9, and the digital data is supplied to a microcomputer 11. The microcomputer 11 calculates a defocusing amount y of a photographing lens (not shown) using the distance x based on the equation (4) described above, and drives a lens actuator 10 in accordance with the calculated value y. The photographing lens is moved by the defocusing amount y by the lens actuator 10, and is stopped at an in-focus position.

Note that reference symbols $S_1$ and $S_2$ denote switches which are turned on upon operation of a release button. The switch $S_1$ is turned on when the release button is lightly depressed by the first stroke, and the switch $S_2$ is turned on when the release button is depressed further deeply by the second stroke.

Figure 3:
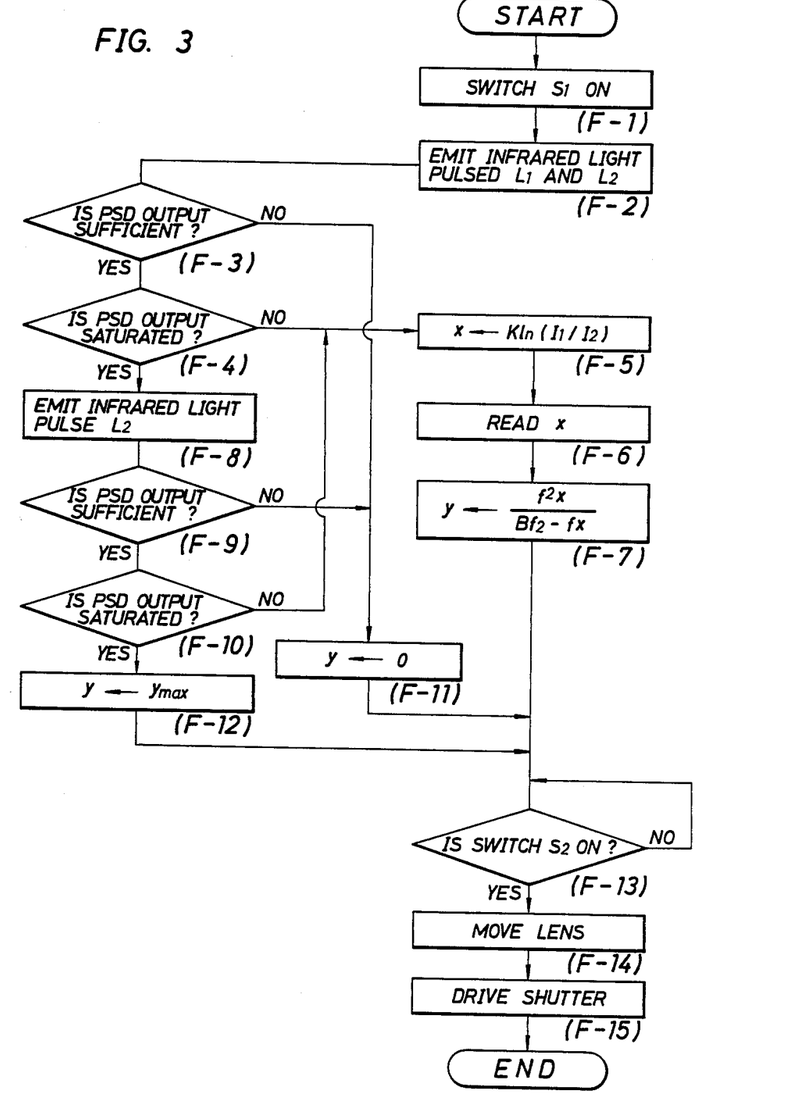
FIG. 3 is a flow chart for explaining a distance measurement operation of the apparatus shown in FIG. 1.

The distance measurement operation will be described with reference to the flow chart shown in FIG. 3.

When a photographer lightly depresses the release button by the first stroke, the switch $S_1$ is turned on (F-1), and a light emission instruction is output from the microcomputer 11 to the driver 7. Thus, the drive pulse signal is supplied from the driver 7 to the light emitting portions $L_1$ and $L_2$ of the LED 6, thereby emitting infrared light pulses for far-distance measurement (F-2). The infrared light pulses are projected forward through the light projecting lens 1, are then reflected by the object 4, and are received on the PSD 5 through the light receiving lens 2. The currents $I_1$ and $I_2$ are output from the PSD 5 to the arithmetic processor 8.

The arithmetic processor 8 checks if the output currents $I_1$ and $I_2$ are at a minimum level or higher necessary for calculation (F-3). If YES in step F-3, it is checked if the outputs from the PSD 5 are saturated (F-4). In these steps F-3 and F-4, it can be determined if the outputs from the PSD 5 fall within the dynamic range. If the outputs from the PSD 5 fall within the dynamic range, the arithmetic processor 8 calculates the distance x based on the above-mentioned equation (1) (F-5), and the distance x is A/D-converted to digital data by the A/D converter 9. The digital data is then read by the microcomputer 11 (F-6). The microcomputer 11 calculates the defocusing amount y based on equation (4) (F-7).

As described above, since both the light-emitting portions $L_1$ and $L_2$ of the LED 6 are operated to output the infrared light pulses for far-distance measurement, a distance to a far-distance object can be measured. Since the light-emitting portions $L_1$ and $L_2$ are arranged in a direction perpendicular to the base line A, as described above, the width of the spot light in the direction of the base line can be reduced as compared to cases wherein the same amount of light is projected using a square LED having the same area as the total area of the portions $L_1$ and $L_2$ or wherein the light is projected from two LEDs arrayed in the direction of the base line (see FIG. 12). Therefore, a distance measurement error can be eliminated, and accurate far-distance measurement can be performed.

In this case, another arrangement may be proposed in order to increase a light-emitting intensity. That is, two LEDs are arrayed in the direction of the base line for far-distance measurement. However, with this arrangement, since the centers of gravity of LED images on the PSD are different from each other, the distance measurement result must be corrected. However, according to the present invention, since the light-emitting portions $L_1$ and $L_2$ of the LED 6 are arrayed in a direction perpendicular to the base line A, the center of gravity of the spot image is not changed, and no correction is required.

If the outputs from the PSD 5 are saturated (F-4), the arithmetic processor 8 outputs a re-emission signal to the microcomputer 11. In response to this, the microcomputer 11 outputs a re-emission instruction to the driver 7. The driver 7 causes the light-emitting portion $L_2$ to output infrared light pulses for near-distance measurement (F-8).

The reason why the outputs from the PSD 5 are saturated is that the object 4 is too close and light reflected thereby is too strong. Thus, if only the light-emitting portion $L_2$ emits light, the light reflected by the object 4 becomes weak, and the outputs from the PSD 5 are not saturated but can be precise values.

The arithmetic processor 8 checks if the outputs from the PSD 5 are sufficient upon emission of the light-emitting portion $L_2$ (F-9). If YES in step F-9, it is checked if the outputs from the PSD 5 are saturated (F-10). If NO in step F-10, the distance x is calculated based on the output currents (F-5), and the calculated distance x is converted to digital data. The digital data is read by the microcomputer 11 (F-6). Then, the microcomputer 11 calculates the defocusing amount y (F-7).

If the outputs from the PSD 5 are not sufficient (F-3 or F-9), or if the outputs therefrom are saturated (F-10), it is determined that the object distance is the farthest distance (e.g., infinity) or closest distance (e.g., 50 cm or less). Therefore, the defocusing amount y is set to 0 or ymax. More specifically, if both the outputs from the PSD 5 are not sufficient upon emission of the light-emitting portions $L_1$ and $L_2$, the object distance is determined to be an infinity, and the amount y is set to be 0 (F-11). However, if the outputs from the PSD 5 are saturated, the object distance is determined to be shorter than the closest distance, and the amount y is set to be ymax (F-12).

When the distance measurement operation is completed as described above and the release button is depressed deeper, the switch $S_2$ is turned on (F-13). Thereby, the photographing lens is moved by the defocusing amount y calculated previously (F-14). Then, a shutter is driven (F-15), thus completing a photographing operation.

Figure 4A:
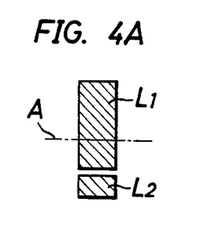
FIGS. 4A to 4C are views showing other arrangements of a light-emitting portion of the infrared LED.
Figure 4B:
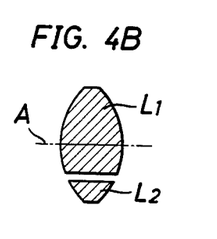
Figure 4C:
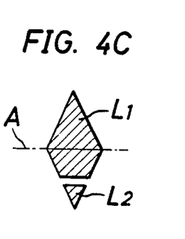

In the above embodiment, the light-emitting portions $L_1$ and $L_2$ of the LED 6 have a rectangular shape of an identical size, as shown in FIG. 2. However, the present invention is not limited to this. For example, the light-emitting portions $L_1$ and $L_2$ may have shapes as shown in FIGS. 4A to 4C. In this case, the light-emitting portions preferably have a small width in the direction of the base line A, and are preferably elongated in a direction perpendicular to the base line A in order to reduce a distance measurement error.

In the above embodiment, both the light-emitting portions $L_1$ and $L_2$ emit light for far-distance measurement. Instead, the light emission intensity of the light-emitting portion $L_1$ may be increased for far-distance measurement, and the light-emitting portion $L_2$ may be operated for near-distance measurement.

In the above embodiment, the light-emitting element has two light-emitting portions. However, the present invention is not limited to this. For example, a larger number of light-emitting portions or light-emitting elements may be employed as long as a camera space or optical system design allows. In this manner, more accurate distance measurement can be achieved. In the above embodiment, a light-emitting circuit is controlled such that light for far-distance measurement is emitted first, and then, light for near-distance measurement is emitted. However, the light-emission order may be reversed as needed.

According to the present invention as described above, a plurality of light-emitting elements are arranged at different positions in a direction perpendicular to the base line and the optical axis of projected light, and are selectively emitted so as to selectively emit near-distance measurement light and far-distance measurement light, thereby measuring a distance to an object. Thus, far-distance measurement is performed using projected light having a high intensity and a small width in the direction of the base line, and near-distance measurement is performed using a low intensity. Thus, both far and near distances can be accurately measured.

Figures 5, 6:
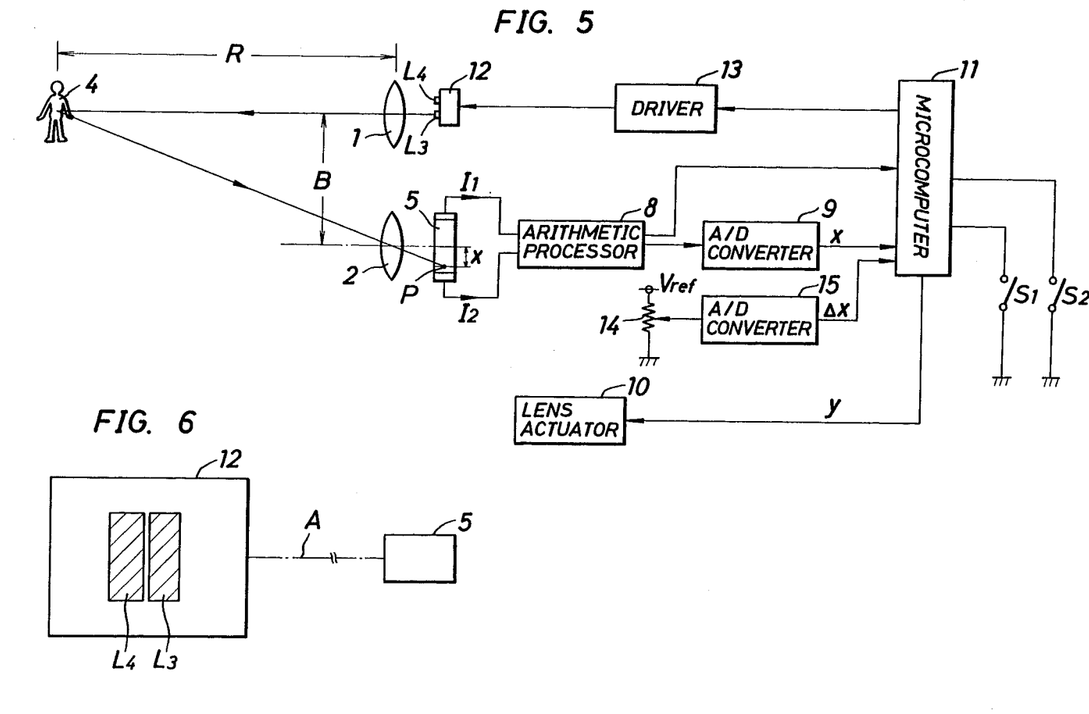
FIG. 5 is a block diagram showing another embodiment of the present invention.
FIG. 6 is a front view of an infrared LED used in the embodiment shown in FIG. 5.

FIG. 5 shows another embodiment of the present invention. The same reference numerals in FIG. 5 denote the same parts as in FIG. 1, and a detailed description thereof will be omitted.

In FIG. 5, reference numeral 12 denotes an infrared LED serving as a light-emitting element. As shown in FIG. 6, the LED 12 has two light-emitting portions $L_3$ and $L_4$ at different positions in a direction of a base line A. The light-emitting portion $L_3$ is used for far-distance measurement, and the light-emitting portion $L_4$ is used for near-distance measurement. The light emission intensity of the light-emitting portion $L_3$ is higher than that of the light-emitting portion $L_4$. The light-emitting portion $L_4$ is arranged at a position opposite to a PSD 5.

Reference numeral 13 denotes a driver for selectively causing the light-emitting portions $L_3$ and $L_4$ to emit light; 14, a semifixed resistor for setting a correction amount $\Delta x$ for correcting a calculation result x of an arithmetic processor 8; and 15, an A/D converter for A/D-converting the correction amount (voltage value) set by the semifixed resistor 14 into digital data and supplying it to a microcomputer 11.

In this embodiment, the light-emitting portions $L_3$ and $L_4$ are arranged at an interval in the direction of base line. For this reason, an LED image formed upon emission of the light-emitting portion $L_4$ is located on the PSD 5 nearer the LED 12 than an LED image formed on the PSD 5 upon emission of the light-emitting portion $L_3$. When the light-emitting portion $L_4$ emits light, the calculation result x must be corrected by a predetermined correction amount $\Delta x$.

Figure 7:
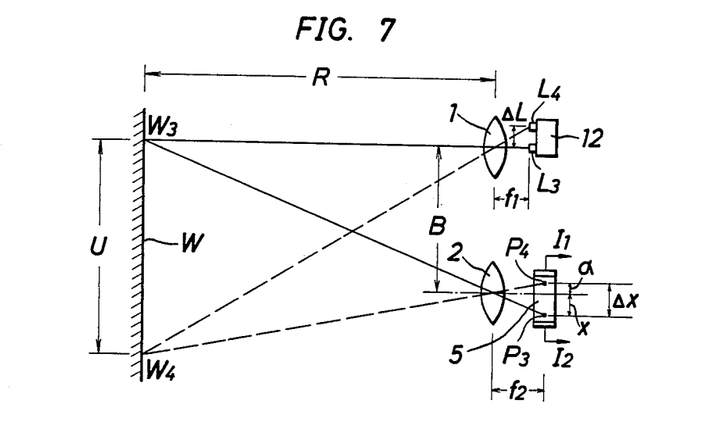
FIG. 7 is a view for explaining a correction amount of a light spot position of a PSD.

The correction will be described with reference to FIG. 7. Assume that a distance to a wall W separated from a light projecting lens 1 by R. Light emitted from the light-emitting portion $L_3$ is reflected at a point $W_3$ of the wall W, and is focused at a point $P_3$ on the PSD 5. However, light emitted from the light-emitting portion $L_4$ is reflected at a point $W_4$, and is focused on a point $P_4$. When the light-emitting portion $L_4$ is used, correction can be made such that the point $P_4$ coincides with the point $P_3$. A distance between the points $P_4$ and $P_3$ is given as a correction amount $\Delta x$. When the light-emitting portion $L_4$ is used, $\Delta x$ can be added to the light spot position of the PSD 5, thus achieving correction.

If a distance between the light-emitting portions $L_3$ and $L_4$ is given as $\Delta L$, and focal lengths of the light projecting lens 1 and light receiving lens 2 are respectively given as $f_1$ and $f_2$, and a distance between the points $W_3$ and $W_4$ is given as U, U is expressed by:

$$U = \frac{\Delta L \cdot R}{f_1} \qquad (5)$$

If a distance from the center of the PSD 5 to the point $P_3$ is given as x, and a distance to the point $P_4$ is given as $\alpha$, since $(U-B): R = \alpha : f_2$, $\alpha$ is given by:

$$\alpha = \frac{f_2 \cdot \Delta L}{f_1} - \frac{B \cdot f_2}{R} \qquad (6)$$

therefore, $$\Delta x = x + \alpha = \frac{f_2}{f_1} \cdot \Delta L \qquad (7)$$

In this manner, the correction amount $\Delta x$ can be calculated in advance using parameters $f_1$, $f_2$, and $\Delta L$. However, in individual distance measurement apparatuses, the correction amount $\Delta x$ does not always coincide with a design value due to variations in optical systems, LEDs, and PSDs, or variations in their assembly positions. In the embodiment shown in FIG. 5, the resistance of the semifixed resistor 14 is changed to adjust and input the correction amount $\Delta x$. This adjustment is performed during, e.g., the steps in the manufacture of a camera.

A method of setting the correction amount $\Delta x$ is not limited to the semifixed resistor 14. A method using a semiconductor memory, e.g., a method of directly writing the correction amount $\Delta x$ in an EPROM, may be employed.

Figure 8:
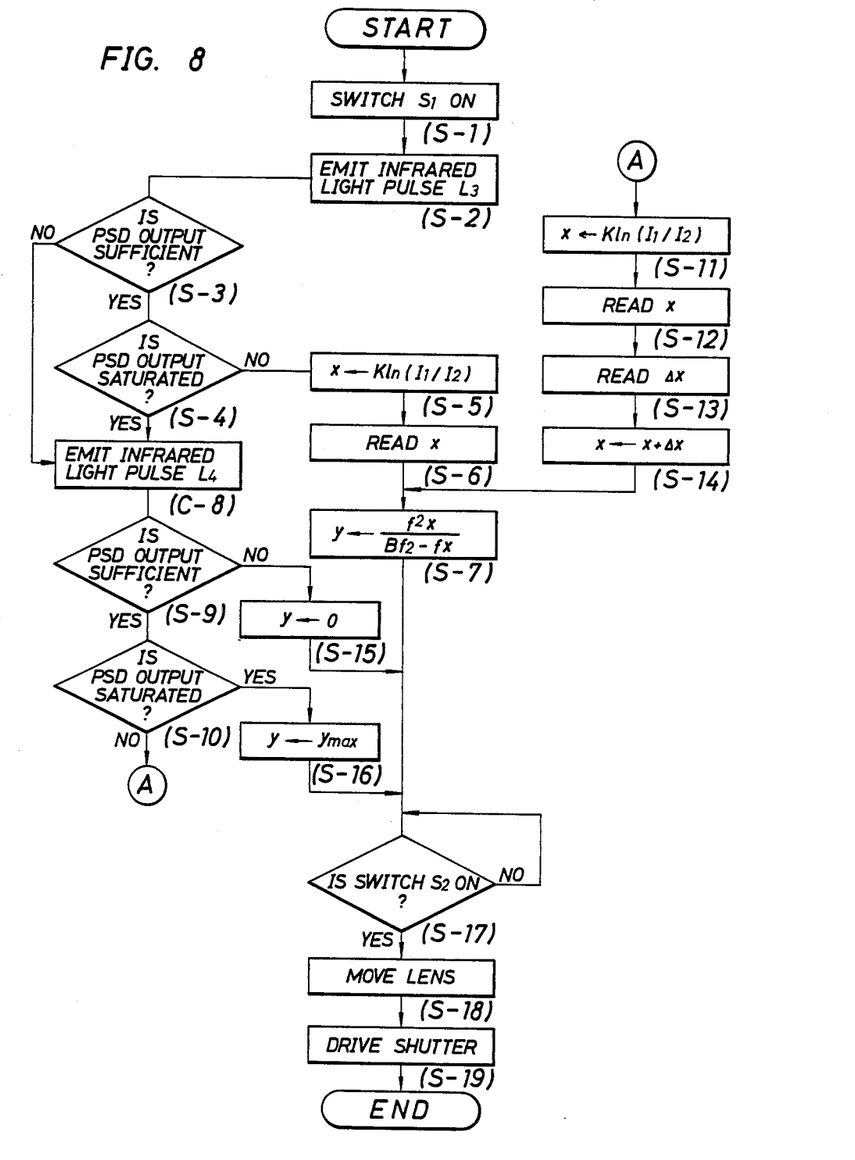
FIG. 8 is a flow chart for explaining the operation of the embodiment shown in FIG. 5.

The operation of this embodiment will be described with reference to the flow chart shown in FIG. 8.

When a photographer lightly depresses the release button by the first stroke, the switch $S_1$ is turned on (S-1), and a light emission instruction is output from the microcomputer 11 to the driver 13. Thus, the drive pulse signal is supplied from the driver 13 to the light emitting portions $L_3$ of the LED 12, thereby emitting infrared light pulses for far-distance measurement (S-2). The infrared light pulses are projected forward through the light projecting lens 1, are then reflected by the object 4, and are received on the PSD 5 through the light receiving lens 2. The currents $I_1$ and $I_2$ are output from the PSD 5 to the arithmetic processor 8.

The arithmetic processor 8 checks if the output currents $I_1$ and $I_2$ are at a minimum level or higher necessary for calculation (S-3). If YES in step S-3, it is checked if the outputs from the PSD 5 are saturated (S-4). In these steps S-3 and S-4, it can be determined if the outputs from the PSD 5 fall within the dynamic range. If the outputs from the PSD 5 fall within the dynamic range, the arithmetic processor 8 calculates the distance x based on the above-mentioned equation (1) (S-5), and the distance x is A/D-converted to digital data by the A/D converter 9. The digital data is then fetched by the microcomputer 11 (S-6). The microcomputer 11 calculates the defocusing amount y based on equation (4) (S-7).

If the outputs from the PSD 5 are insufficient or saturated (S-4), the arithmetic processor 8 outputs a re-emission signal to the microcomputer 11. In response to this, the microcomputer 11 outputs a re-emission instruction to the driver 13. The driver 13 causes the light-emitting portion $L_4$ to output infrared light pulses for near-distance measurement (S-8).

The outputs from the PSD 5 become insufficient when the following two cases occur. First, the object 4 is far, and the PSD 5 cannot provide sufficient outputs. Second, the object 4 is too close, and a received LED image falls outside the PSD 5. In the former case, sufficient outputs cannot be obtained from the PSD 5 even if the light-emitting portion $L_4$ is operated. However, in the latter case, since an LED image can be formed within the range of the PSD 5 if the light-emitting portion $L_4$ is operated, it can be detected. Since the position of the light-emitting portion $L_4$ is located above the light-emitting portion $L_3$ in FIG. 5 (not at the PSD 5 side), an LED image P on the PSD 5 is received at a position near the center of the PSD 5.

The reason why the outputs from the PSD 5 are saturated is that the object is too close, and light reflected by the object comes too strong. In this case, if the light-emitting portion $L_4$ having a lower light-emission intensity than that of the light-emitting portion $L_3$ is operated, light reflected by the object 4 becomes weak, and the outputs from the PSD 5 can be subjected to calculation.

The arithmetic processor 8 then checks if the outputs from the PSD 5 upon emission of the light-emitting portion $L_4$ are sufficient (S-9). If YES in step S-9, it is checked if the outputs from the PSD 5 are saturated (S-10). If NO in step S-10, the arithmetic processor 8 calculates the distance x based on the output currents (S-11). The calculation result is converted to digital data by the A/D converter 9, and is fetched by the microcomputer 11 (S-12).

In this case, the distance x is obtained upon operation of the light-emitting portion $L_4$, and must be corrected, as described above. The correction value $\Delta x$ set by the semifixed resistor 14 is fetched by the microcomputer 11 through the A/D converter 15 (S-13), and the calculated distance x is added to the correction amount $\Delta x$ (S-14). The microcomputer 11 calculates the defocusing amount y using the corrected distance x (S-7).

If the outputs from the PSD 5 are not sufficient even if the light-emitting portion $L_4$ is operated (S-9) or if the outputs are saturated (S-10), the object distance is set to be the farthest distance (e.g., an infinity) or the closest distance (e.g., 50 cm). Therefore, the defocusing amount y is set to be 0 or ymax. More specifically, when the outputs from the PSD 5 are not sufficient upon emission of the light-emitting portions $L_3$ and $L_4$, the object distance is determined to be an infinity, and the amount x is set to be 0 (S-15). If both the outputs from the PSD 5 are saturated, it is determined that the object distance is shorter than the closest distance, and the amount y is set to be ymax (S-16).

The distance measurement operation is completed, as described above. When the release button is depressed still deeper, the switch $S_2$ is turned on (S-17), and the the photographing lens is moved by the lens actuator 10 by the defocusing amount y calculated previously (S-17). Then, the shutter is driven (S-19), thus completing a photographing operation.

Figure 9A:
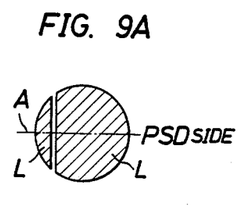
FIGS. 9A to 9C are views showing other arrangements of a light-emitting portion of the infrared LED used in the embodiment shown in FIG. 5.
Figure 9B:
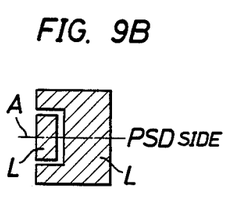
Figure 9C:
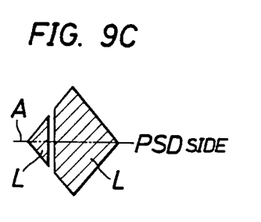

In the above embodiment, the light-emitting portions $L_3$ and $L_4$ of the LED 12 have a rectangular shape of an identical size, as shown in FIG. 6. However, the present invention is not limited to this. For example, the light-emitting portions $L_3$ and $L_4$ may have shapes as shown in FIGS. 9A to 9C. In this case, the light-emitting portions preferably have a short width in the direction of the base line A, and are preferably elongated in a direction perpendicular to the base line A in order to reduce a distance measurement error.

In the above embodiment, the light-emitting portion is used for far-distance measurement. However, both the light-emitting portions $L_3$ and $L_4$ can be emitted for the far-distance measurement, and thereafter, only the light-emitting portion $L_4$ can be emitted for near-distance measurement. In this case, since light emitted from the light-emitting portion $L_4$ is additionally used as light for far-distance measurement, the position of the center of gravity of the LED image on the PSD 5 is offset. Therefore, the calculation result from the arithmetic processor 8 must be corrected.

In the above embodiment, the light-emitting element has two light-emitting portions. However, the present invention is not limited to this. For example, a larger number of light-emitting portions or light-emitting elements may be employed as long as a camera space or optical system design allows. In this manner, more accurate distance measurement can be achieved. In the above embodiment, a light-emitting circuit is controlled such that light for far-distance measurement is emitted first, and then, light for near-distance measurement is emitted. However, the light-emission order may be reversed as needed.

According to the present invention as described above, a plurality of light-emitting elements are provided at different positions in a direction of base line, and are selectively emitted by a drive means so as to output far-distance measurement light and near-distance measurement light. A light-emitting element which is arranged not at a light-receiving element side, and has a lower light emission intensity than that for far-distance measurement is used for near-distance measurement. Since light reflected by a near object can be appropriately caught, a near distance can be accurately measured.

According to the present invention, since near-distance measurement light is output from a light-emitting element which is not at the side of the light-receiving element, a finder incident angle of light reflected by the object can be decreased, parallax of a finder distance measurement frame can be advantageously reduced.

I claim:

1. A distance measurement apparatus for a camera comprising: a plurality of light-emitting elements arranged at different positions in a direction perpendicular to a base line and an optical axis of projected light; a light-receiving element for receiving light emitted from said light-emitting elements and reflected by an object so as to output an electric signal corresponding to a distance to the object; drive means for causing said light-emitting elements to selectively emit near-distance measurement light and far-distance measurement light having a higher intensity than that of the near-distance measurement light; arithmetic means for calculating the distance to the object based on the electric signal from said light-receiving element; and control means for, when an amount of light reflected by an object cannot reach a predetermined value necessary for distance measurement upon emission of a light-emitting element selected by said drive means, controlling an operation of said drive means so as to cause another light-emitting element to emit light.

2. An apparatus according to claim 1, wherein each of said light-emitting elements comprises an infrared LED.

3. An apparatus according to claim 1, wherein said light-receiving element comprises a PSD (Position Sensitive Device) for detecting a light spot position thereon.

4. A distance measurement apparatus for a camera comprising: a plurality of light-emitting elements arranged at different positions in a direction of base line; a light-receiving element for receiving light emitted from said light-emitting elements and reflected by an object so as to output an electric signal corresponding to a distance to the object; drive means for causing said light-emitting elements to selectively emit far-distance measurement light obtained upon emission of at least a light-emitting element at a side of said light-receiving element, and near-distance measurement light having a lower intensity than that of the far-distance measurement light and obtained upon emission of a light-emitting element not at the side of said light-receiving element; arithmetic means for calculating the distance to the object based on the electric signal from said light-receiving element; correction means for correcting the distance calculated by said arithmetic means in accordance with the light-emitting element selected by said drive means; and control means for, when said light-receiving element cannot output a predetermined electric signal necessary for distance measurement only by emission of the light-emitting element selected by said drive means, controlling an operation of said drive means to cause another light-emitting element to sequentially emit light.

5. An apparatus according to claim 4, wherein each of said light-emitting elements comprises an infrared LED.

6. An apparatus according to claim 4, wherein said light-receiving element comprises a PSD (Position Sensitive Device) for detecting a light spot position thereon.

* * * * *